United States Patent [19]

Nishimura et al.

[11] Patent Number: 5,525,649
[45] Date of Patent: Jun. 11, 1996

[54] MAGNETIC PAINT AND PROCESS FOR PRODUCING THE SAME

[75] Inventors: Akihiro Nishimura, Los Altos, Calif.; Kazuyuki Hayashi, Hiroshima, Japan; Keisuke Iwasaki, Hiroshima, Japan; Yasuyuki Tanaka, Hiroshima, Japan; Hiroko Itamochi, Hiroshima, Japan

[73] Assignee: Toda Kogyo Corp., Hiroshima-ken, Japan

[21] Appl. No.: 442,703

[22] Filed: May 17, 1995

Related U.S. Application Data

[62] Division of Ser. No. 845,933, Mar. 6, 1992, abandoned.

[30] Foreign Application Priority Data

| | | | |
|---|---|---|---|
| Mar. 18, 1991 | [JP] | Japan | 3-80876 |
| Aug. 30, 1991 | [JP] | Japan | 3-246576 |
| Sep. 30, 1991 | [JP] | Japan | 3-280707 |

[51] Int. Cl.$^6$ ............................ C08L 27/06
[52] U.S. Cl. .............. 523/322; 523/313; 523/319; 523/324; 366/83; 366/84; 366/85
[58] Field of Search ...................... 523/313, 319, 523/322, 324; 366/83, 84, 85, 301, 319, 605

[56] References Cited

U.S. PATENT DOCUMENTS

| | | | |
|---|---|---|---|
| 4,534,652 | 8/1985 | Spade | 366/85 |
| 4,596,739 | 6/1986 | Pittingsrud et al. | 428/315.9 |
| 4,859,500 | 8/1989 | Kakuta et al. | 427/128 |
| 4,946,615 | 8/1990 | Mizuno et al. | 252/62.54 |
| 5,061,570 | 10/1991 | Nishimura et al. | 428/480 |
| 5,075,169 | 12/1991 | Nagai et al. | 428/402 |

FOREIGN PATENT DOCUMENTS 3734978  4/1988  Germany .

*Primary Examiner*—Paul R. Michl
*Assistant Examiner*—U. K. Rajguru
*Attorney, Agent, or Firm*—Nixon & Vanderhye

[57] ABSTRACT

Disclosed herein in are a magnetic paint composed of a kneaded composition comprising fine magnetic iron based alloy particles, acicular fine magnetic iron oxide particles or plate-like fine magnetic ferrite particles, a binder resin and an organic solvent, the solid content of the fine magnetic iron based alloy particles, the acicular fine magnetic iron oxide particles or plate-like fine magnetic ferrite particles and the binder resin in the kneaded composition being from 65 to 85% by weight, the binder resin being from 5 to 30% by weight based on the fine magnetic iron based alloy particles, the acicular fine magnetic iron oxide particles or plate-like fine magnetic ferrite particles, and a gloss at 45° after dispersion for 6 hours being not less than 120% when formed into a coating film; and a method of preparing the same.

1 Claim, No Drawings

MAGNETIC PAINT AND PROCESS FOR PRODUCING THE SAME

This is a division of application Ser. No. 07/845,933, filed Mar. 6, 1992, now abandoned.

BACKGROUND OF THE INVENTION

Present invention relates to a magnetic paint and a process for producing the same, and more specifically, it relates to a magnetic paint in which magnetic particles, in particular, those having an average particle diameter of not greater than 0.25 μm can exhibit excellent dispersibility rapidly and easily upon preparing a magnetic paint, possess a great saturation magnetization and a high coercive force for a long period of time while preventing oxidation with oxygen in air as much as possible, and can be transported and stored with an industrial and economical advantage merely by vacuum-packaging with a synthetic resin film, as well as a process for producing such a magnetic paint.

In recent years, with progressing longer recording time as well as miniaturization and weight-reduction of magnetic recording and reproducing apparatuses for video and audio applications, a violent development of VTR (video tape recorders) have been conducted and a demand for improving a performance of magnetic tapes as a magnetic recording medium, for example, higher recording density and improved output characteristics.

The above-mentioned properties of the magnetic recording medium have a close relationship with magnetic particles used for the magnetic recording medium. In recent years, magnetic iron based alloy particles having a higher coercive force and a greater saturation magnetization as compared with conventional magnetic iron oxide particles have been noted and put to practical use in digital audio-tapes(DAT), 8 mm-width video tapes, Hi-8 tape and video floppies. Along with the demand for higher image quality of the video tapes, a frequency of carrier signals to be recorded has become higher, that is, has been shifted to a shorter wavelength region, and as a result, a magnetization depth from the surface of a magnetic tape becomes remarkably shallow as compared with the recording of conventional video tapes.

In view of the above, the improvement of high output characteristics to signals of short wavelength while maintaining a CN ratio has been conducted and it has been required for this purpose to ① make the magnetic particles finer, ② increase the dispersibility of the magnetic particles, ③ smooth the surface of the magnetic coating layer, and ④ reduce the film thickness of the magnetic coating layer.

The facts mentioned above are stated in, for example, *Development for Magnetic Material and High Dispersion Technology of Magnetic Powder* published from Kabushiki Kaisha Sogo Gijutsu Center, p. 312(1982) as "Condition required for high density recording in a coating-type tape is that high output characteristics can be maintained at a low noise level for short wavelength signals, and for this purpose, it is necessary that both of the coercive force (Hc) and the residual magnetic flux density (Br) are great, and the thickness of the coating layer is further reduced", as well as *Nikkei Electronics,* May 3,(1976) pp. 82–105 as "As physical quantities of a tape related to the SN ratio (CN ratio) of luminance signals, an average number of particles per unit volume, their state of dispersion (dispersibility), and the surface smoothness may be mentioned. Since the SN ratio is improved in proportion with the square root for the average number of particles providing that the surface property and the dispersibility are constant, magnetic particles with a smaller particle volume and higher packing density are more advantageous."

Also, the residual magnetic flux density (Br) of the magnetic recording medium depends on the dispersibility in a vehicle, the orientation property in a coated film and the packing property of magnetic particles.

Improvement for the characteristics of the magnetic particles has been demanded more and more, and in view of the improvement for the noise level of the magnetic recording medium and the enhancement for the output characteristics of the magnetic recording medium, it is required that the magnetic particles are fine particles, and have an excellent dispersibility in a magnetic paint, and in particular, it is required that magnetic iron based alloy particles, can possess a great saturation magnetization and a high coercive force for a long period of time by preventing oxidation with oxygen in air as much as possible.

It has been known that the noise level of the magnetic recording medium has a close relationship with the particle size of the magnetic particles used and that the noise level is tends to be more lowered and improved as the particles size becomes smaller. In particular, fine magnetic particles of not greater than 0.25 μm in particle size have been demanded in recent years.

On the other hand, the size of the magnetic particles becomes smaller, the more the dispersibility of the magnetic particles in the magnetic paint is lowered and as a result, the smoothness at the surface of the resultant magnetic coating film is worsened, making it difficult to reduce the film thickness. In view of the above, it has been demanded for a magnetic paint comprising fine magnetic particles capable of providing excellent dispersibility rapidly and easily.

Heretofore, Japanese Patent Applications Laid Open (KOKAI) Nos. 62-22867, 64-79274 and 64-79265 disclose a magnetic paint prepared by kneading magnetic particles, a binder resin and an organic solvent by using a kneader having a high shearing force such as a kneader, planetary mixer, disperser and twin-shaft continuous kneader to form a kneading composition, and then diluting to the thus-obtained composition of an appropriate solid concentration by using a diluting kneader such as a planetary mixer, a disperser, a paint conditioner and a twin-shaft continuous kneader, prior to the dispersion of the composition composed of magentic particles, the binder resin and the organic solvent into a vihicle by using a disperser such as a ball mill or a sand grinder.

In a conventional method, it is difficult to obtain rapidly and easily an excellent dispersion upon producing the magnetic paint. As described in, for example, *Magnetic Paint Considered from a Point of Research Worker for Magnetic Recording Material,* in Powder Metallurgy, "Seventh Summer Ferrite Seminar—Summary of Lecture" (1977), pp. 14–16, "Generally, it is a rather difficult to obtain high dispersion even in the case of a usual non-magnetic paint. Much more, in the case of the magnetic powder, the phenomenon is made more complicate due to the magnetic interaction between the particles"; the magnetic particles form a coagulated form due to magnetic interaction between each of particles and accordingly, the particles are present in coagulated form in the vehicle. Particularly, in the case of plate-like ferrite particles having an axis of easy magnetization in perpendicular to the plate surface, since the particles are coagulated to each other due to the magnetic interaction, it is difficult to separate the coagulated particles into individual particles merely by a mechanical treatment.

As magnetic particles which are suitable to high output and high density recording, that is, as magnetic particles having high coercive force, magnetic iron based alloy particles have been known.

As the magnetic iron based alloy particles, there can be mentioned magnetite ($FeO_x \cdot Fe_2O_3 : 0 < x \leq 1$) particles having characteristics of a higher coercive force, a greater saturation magnetization and less chargeability when used in a magnetic recording medium due to high electroconductivity as compared with those of maghemite particles not containing ferrous, as well as magnetic iron oxide particles obtained by using the above-mentioned magnetite particles or the meghemite particles described above as precursor particles and depositing cobalt and ferrous to the surface of the precursor particles (hereinafter referred to as Co-coated magnetic iron oxide particles).

Although the magnetic iron based alloy particles as described above possess a high coercive force, they involve a drawback of magnetic and chemical instability, and it has been pointed out a problem in view of the operability or safety upon preparing the magnetic particles, as well as a problem from a safety and economical point of view in transportation and storage.

That is, when the magnetic iron based alloy particles are left in air, ferrous is oxidized into ferric iron and as a result the magnetic property, in particular, the coercive force and saturation magnetization is reduced with the passage of time. The phenomenon tends to be remarkable as the particle size becomes smaller.

Further, the magnetic iron based alloy particles have been generally obtained by using, as the starting material, acicular iron (III) oxide hydroxide particles, acicular hematite particles obtained by dehydrating the acicular iron (III) oxide hydroxide particles under heating at temperature of less than 300° C., or high-density acicular hematite particles obtained by heat-treating the acicular iron (Ill) oxide hydroxide particles in a non-reducing atmosphere at a temperature of not more than 300° C., and reducing such a starting material under heating in a hydrogen gas. The formation of oxide layers to the surface of the thus-obtained particles is carried out by various kinds of well-known methods such as supplying method of an inert gas in which an oxygen content therein is increased gradually, whereby the thus-obtained magnetic iron based alloy particles are stabilized against oxidation with oxygen in air and then can be taken out into air.

However, even magnetic iron based alloy particles having the oxide layer formed at the surface of the particles, can not be effectively kept from oxidation with oxygen in air only by the oxide layer after being taken out into air, so that the saturation magnetization and the coercive force is gradually reduced with passage of time and, further, there is a danger of generating heat or causing ignition during transportation or storage.

In particular, the coercive force of the magnetic iron based alloy particles is improved as the particle size is reduced. However, since the surface activity of the particles becomes excessively large and the particles violently react with oxygen in air to heat-generate and, in an extreme case, to cause ignition, thereby lowering the coercive force and the saturation magnetization, an utmost care is necessary for the handling.

Further, the magnetic iron based alloy particles liable to cause danger such as of heat-generation or ignition are transported and stored, for example, by a method of sufficiently wetting the magnetic iron based alloy particles with an organic solvent and tightly sealing them in a container made of metal such as a can, or a method of placing the magnetic iron based alloy particles in a metal container such as a can and then tightly sealing them after purging with an inert gas. However, there are a safety problem due to the use of the organic solvent and operational and economical problems such as in packaging, handing and in the space for transportation and storage.

In view of the above, there is demanded a method for transporting or storing magnetic iron based alloy particles safely with the least danger and with an economical advantage capable of minimizing the space for the transportation and storage by a simple package.

It has been most demanded at present that the magnetic iron based alloy particles are fine particles, have an excellent dispersibility in a magnetic paint, can maintain a high coercive force and a large saturation magnetization for a long period of time while preventing oxidation with oxygen in air as much as possible, and can be transported and stored with an economical and industrial advantage by package which is safe without danger, convenient and simple. But, there has not yet been supplied a method capable of satisfying such various demands.

Namely, magnetic iron based alloy particles obtained by the well-known method inevitably suffer from remarkable reduction of the saturation magnetization and the coercive force due to the oxidation with oxygen in air with the passage of time when they are taken into air, if the particles are fine, in particular, not greater than 0.25 µm. In addition, upon preparing the magnetic paint, dispersibility of the particles in the magnetic paint is not yet sufficient, because the effect of the shearing stresses to the magnetic iron based alloy particles during kneading is not sufficient.

In addition, in the case of using the known method for transportation and storage, there are safety problems due to the use of the organic solvent, as well as industrial and economical problems such as in packaging, handing in the space for transportation and storage.

It has, accordingly, been demanded for a provision of a magnetic paint in which the dispersibility of fine magnetic iron based alloy particles having an average particle diameter of not greater than 0.25 µm in the magnetic paint is excellent, and large saturation magnetization and high coercive force can be maintained over a long period of time by preventing oxidation due to oxygen in air as much as possible, and which can be transported and stored with an industrial and economical advantage, as well as a method of preparing such a magnetic paint.

As a result of an earnest study of the present inventors, it has been that found by kneading magnetic particles such as fine magnetic iron based alloy particles, acicular fine magnetic iron oxide particles and plate-like fine magnetic ferrite particle having an average particle size of not greater than 0.25 µm, a binder resin and an organic solvent by using a twin-shaft continuous kneader comprising a container and two stirring shafts disposed and rotatably journaled in parallel with each other in the container, in which each of the stirring shaft has alternately screw portions and paddle portions mounted to the stirring shaft, the ratio of the shaft length to the shaft diameter of the stirring shaft is not less than 25 and a clearance between the wall of the container and the end of the paddle end is not greater than 0.25 mm, and if required, adding a solvent to the kneaded product and diluting them under kneading by using dilution kneader, the thus-obtained magnetic paint is a composition kneaded such that the-solid content of the magnetic particles and the binder resin in the kneaded composition is from 65 to 85% by weight, and the binder resin is from 5 to 30% by weight based on the magnetic particles, and shows a high dispersibility so that a gloss at 45° after dispersion for 6 hours is not less than 120% when formed into a coating film, and the magnetic paint can be packaged under vacuum with a synthetic resin film having acid resistance, water proofness and solvent resistance. The present invention has been attained on the basis of this findings.

SUMMARY OF THE INVENTION

In a first aspect of the present invention, there is provided a magnetic paint composed of a kneaded composition comprising fine magnetic iron based alloy particles, acicular fine magnetic iron oxide particles or plate-like fine magnetic ferrite particles, a binder resin and an organic solvent, the solid content of the fine magnetic iron based alloy particles, the acicular fine magnetic iron oxide particles or plate-like fine magnetic ferrite particles and the binder resin in the kneaded composition being from 65 to 85% by weight, the binder resin being from 5 to 30% by weight based on the fine magnetic iron based alloy particles, the acicular fine magnetic iron oxide particles or plate-like fine magnetic ferrite particles, and a gloss at 45° after dispersion for 6 hours being not less than 120% when formed into a coating film.

In a second aspect of the present invention, there is provided a magnetic paint composed of a kneaded composition comprising fine magnetic iron based alloy particles, acicular fine magnetic iron oxide particles or plate-like fine magnetic ferrite particles, a binder resin and an organic solvent, the solid content of the fine magnetic iron based alloy particles, the acicular fine magnetic iron oxide particles or the plate-like fine magnetic ferrite particles and the resin binder in the kneaded composition being from 65 to 85% by weight, the binder resin being from 5 to 30% by weight based on the fine magnetic iron based alloy particles, the acicular fine magnetic iron oxide particles or the plate-like fine magnetic ferrite particles, and the deadsorption ratio of the binder resin based on the fine magnetic iron based alloy particles, the acicular fine magnetic iron oxide particles or the plate-like magnetic ferrite particles contained in the kneaded composition being not more than 50% as measured by the following measuring method:

(1) a portion of the kneaded composition is sampled, the solid content remaining after evaporating the organic solvent is determined and then, based on a blending ratio of the organic solvent to a solid content obtained by calculation from the measured weight of the solid content and the blending amount upon kneading the thus-obtained mixture, a predetermined amount of the kneaded composition in which the weight of the fine magnetic iron based alloy particles, the acicular fine magnetic iron oxide particles or the plate-like fine magnetic ferrite particles in the kneaded composition is 10 g, is previously determined by calculation in accordance with the following equation;

Predetermined amount of kneaded composition =
(the fine magnetic iron based alloy particles,
the acicular fine magnetic iron oxide particles or
the plate-like fine magnetic ferrite particles) +
(binder resin) + (organic solvent) = 10 g +
(solid content(g) − 10 g) + (solid content(g)) ×
(blending ratio of the organic solvent)

(2) the predetermined mount of the kneaded composition obtained by the calculation is sampled and placed together with 120 g of 3 mm⌀ steel balls into a 100 ml of plastic bottle;

(3) an organic solvent mixture (methyl ethyl ketone: cyclohexanone =1:1) is added to the 100 ml plastic bottle such that concentration of the solid content is 20% and subsequently, dispersed by a paint conditioner for 6 hours to form a magnetic paint;

(4) the magnetic paint is separated into a solid content and a supernatant by a centrifugator at 10,000 rpm for 30 min;

(5) the supernatant is quantitatively determined and then the solid residue remaining after evaporation to dryness of the supernatant is quantitatively determined to obtain an mount of the binder resin deadsorbed from the fine magnetic iron based alloy particles, the acicular fine magnetic iron oxide particles or the plate-like fine magnetic ferrite particles;

Amount of deadsorbed binder resin =
[(amount of organic solvent in the kneaded composition) +
(amount of organic solvent added)] ×
(residual solid content after evaporation to dryness) +
(weight of the supernatant)

(6) the amount of the deadsorbed binder resin based on the amount of the binder resin in the predetermined amount of the kneaded composition is determined on the percentage, which is defined as the deadsorption ratio of the binder resin.

In a third aspect of the present invention, there is provided a magnetic paint material comprising the kneaded composition as defined in the first or second aspect vacuum-packed by a plastic film having an acid resistance, a water proofness and a solvent resistance.

In a fourth aspect of the present invention, there is provided a method of preparing a magnetic paint material comprising kneading fine magnetic iron based alloy particles, acicular fine magnetic iron oxide particles or plate-like fine magnetic ferrite particles, a binder resin and an organic solvent by using a twin-shaft continuous kneader comprising a container and two stirring shafts disposed and rotatably journaled in parallel with each other in the container, in which the stirring shaft has alternately screw portions and paddle portions mounted to the stirring shaft, a ratio of the shaft length to the shaft diameter of the stirring shaft is not less than 25 and a clearance between a wall of the container, and an end of the paddle is not greater than 0.25 min, and if necessary adding a solvent to the kneaded material and then diluting them by using the dilution kneader.

DETAILED DESCRIPTION OF THE INVENTION

As the magnetic particles such as fine magnetic iron based alloy particles, acicular fine magnetic iron oxide particles and plate-like fine magnetic ferrite particles in the present invention, there can be used any of magnetic iron oxide particles such as maghemite particles, magnetite particles and berthollide compound $(FeO_x Fe_2O_3 : 0<x<1)$ particles; particles obtained by incorporating at least one metal such as Co, Al, Ni, P and Zn other than Fe to the said magnetic iron oxide particles; particles obtained by coating the said magnetic iron oxide particles with Co or Co and Fe(II); magnetic iron base alloy particles containing, for example, Co, Ni, Al, P and B other than Fe (Fe/(Fe+added element): not less than 75 wt %); plate-like Ba ferrite particles; and plate-like composite ferrite particles obtained by incorporating at least one of bivalent metals such as Co, Ni and Zn, or tetravalent metals such as Ti, Sn and Zr as a coercive force-reducing agent. Further, the shape of the magnetic particles may be any of acicular, spindle, cubic or plate-like. The aspect ratio (major axial diameter/minor axial diameter) of the acicular magnetic particles is not less than 3. Also the plate ratio (plate diameter/thickness) of the plate-like magnetic particles is not less than 3.

In the present invention, an average particle size of the magnetic particles is not greater than 0.25 µm, preferably 0.01–0.2 µm suitable to the improvement of high output characteristics to short wavelength signals.

The deadsorption ratio of the binder resin to the magnetic particles contained in the kneaded composition according to the present invention is not greater than 50%. If it exceeds 50%, since adsorption of the binder resin to the magnetic particles is week and it is difficult to form a dense continuous layer, this brings about oxidation with oxygen in air, making it impossible to maintain a large saturation magnetization and a high coercive force over a long period of time. In the case where they are vacuum-packed in a plastic film and transported or stored for a long period of time, the deadsorption ratio is preferably not greater than 45%.

The magnetic particles with the deadsorption ratio of the binder resin of not greater than 50% as measured by the following measuring method, even if they are fine, in particular, with an average particle size of not greater than 0.25 µm, can exhibit excellent dispersibility rapidly and easily upon production of a magnetic paint, and in addition, oxidation with oxygen in air can be prevented as much as possible, thereby enabling to maintain a large saturation magnetization and a high coercive force over a long period of time.

The measuring method for the deadsorption ratio of the binder resin is as shown below.

(1) A portion of a kneaded composition is sampled and the solid content remaining after evaporating an organic solvent is determined and, based on a blending ratio of the organic solvent to the solid content obtained by calculation from the measured weight of the solid content and the blending mount upon kneading the thus-obtained mixture, a predetermined amount of the kneaded composition in which the weight of the magnetic particles of the present invention in the kneaded composition is 10 g, is previously determined by calculation in accordance with the following equation.

Predetermined amount of kneaded composition =
   (magnetic particles) + (binder resin) + (organic solvent) =
   10 g + (solid content(g) − 10 g) + (solid content(g)) ×
                     (blending ratio of the organic solvent)

(2) The predetermined amount of the kneaded composition obtained by the calculation is sampled and placed together wigh 120 g of 3 mmø steel balls into a 100 ml of plastic bottle.

(3) An organic solvent mixture (methyl ethyl ketone: cyclohexanone =1:1) is added to the 100 ml plastic bottle such that the concentration of the solid content is 20% and subsequently, dispersed by a paint conditioner for 6 hours to form a magnetic paint.

(4) The magnetic paint is separated into a solid content and a supernatant by a centrifugator at 10,000 rpm for 30 min.

(5) The supernatant is quantitatively determined and then the solid residue remaining after evaporation to dryness of the supernatant is quantitatively determined to obtain an mount of the binder resin deadsorbed from the magnetic particles of the present invention.

Amount of deadsorbed binder resin =
   [(amount of organic solvent in the kneaded composition) +
           (amount of organic solvent added)] ×
   (residual solid content after evaporation to dryness) ÷
                    (weight of the supernatant)

(6) The amount of the deadsorbed binder resin based on the mount of the binder resin in the predetermined mount of the kneaded composition is determined on the percentage, which is defined as the deadsorption ratio of the binder resin.

In the measuring method for the deadsorption ratio of the binder resin, the organic solvent mixture of methyl ethyl ketone (MEK) and cyclohexanone (mixing ratio=1:1) is used as the organic solvent, because this organic solvent mixture is a typical organic solvent used most generally in the production of magnetic paints for magnetic recording media.

As the binder resin in the present invention, those generally employed for the production of magnetic recording media at present can be used, for example, vinyl chloride-vinyl acetate copolymer, vinyl chloride-vinyl acetate-maleic acid urethane elastomer, butadiene acrylonitrile copolymer, polyvinyl butyral, cellulose derivative such as nitrocellulose, polyester, synthetic rubber resin such as polybutadiene, epoxy resin, polyamide, polyisocyanate and electron-ray curable acryl urethane resin, as well as a mixture thereof.

Further, resins having more strong polar functional groups, that is, resins having hydrophilic groups such as COOH group, $SO_3M$ (M=Na, K, H) and $OPO_3H_2$ have been used in recent years may be used.

As the organic solvent in the present invention, there can be used one or more of aromatics such as toluene and xylene, ketones such as methyl ethyl ketone, methyl isobutyl ketone, cyclohexanone and tetrahydrofuran, and esters such as ethyl acetate and butyl acetate.

In the present invention, the solid content of the magnetic particles and the binder resin in the kneaded composition is from 65 to 85% by weight, preferably, 67 to 80% by weight. If the concentration thereof is less than 65% by weight, the viscosity of the kneaded composition is extremely lowered in which shearing stresses required for the dispersion of the magnetic particles is not obtained. On the other hand, if it exceeds 85% by weight, the surface of the magnetic particles is not sufficiently wetted with the solvent or the binder resin, making the distribution of the magnetic particles not uniform in the kneaded product.

In the present invention, the amount of the binder resin to the magnetic particles in the kneaded composition is from 5 to 30% by weight, preferably, from 10 to 25% by weight. If it is less than 5% by weight, sufficient surface adsorption of the binder resin required for dispersing the magnetic particles can not be obtained to render the dispersion of the magnetic particles deteriorated in the resultant magnetic paint. On the other hand, if it exceeds 30% by weight, although the dispersion of the magnetic particles in the magnetic paint is sufficient, the saturation magnetic flux density of the coating film is lowered by the binder resin not contributing to the magnetic property. The kneaded product obtained in accordance with the present invention is in a shape of a pellet or paset, or slurry with an average size of about 1 to 20 mm.

The kneaded product in the present invention is diluted to a solid content concentration of 30 to 60% by weight, preferably 35 to 55% by weight with addition of an organic solvent thereto. If the concentration is less than 30% by weight, the dilution occurs suddenly and it is not homogeneously diluted tending to make the distribution of the magnetic particles not uniform in the diluted, kneaded product. If the concentration exceeds 60% by weight, the dilution is insufficient and it is difficult to attain a viscosity optimum to the dispersion in the dispersing step subsequently.

In the present invention, a dispersant, a lubricant, an abrasive and an antistatic agent such as carbon black employed usually in the production of a magnetic paint may be added. Carbon black which is difficult to be dispersed is preferably added from the beginning of the kneading. Further, this can also attain an effect of improving sliding between each of the magnetic particles by being present in a gap between each of the magnetic particles.

A packaging plastic film used in the present invention may be any of films so long as they have acid resistance, water proofness and solvent resistance. More specifically, there can be used a single layer film composed of polyvinylidene chloride, rubber hydrochloride, high density polyethylene, rigid polyvinyl chloride, moisture-proof cellophane, polyester, polycarbonate, nylon, polypropylene and vinylon, as well as a laminate film comprising two or more of them. If necessary, a laminate film prepared by appending a metal foil to the above-mentioned film may also be used.

The vacuum packaging used in the present invention can be applied by any well-known method such as a method of degasing the inside after packaging or a method of degasing the inside while applying heat sealing. Degree of vacuum is preferably about less than 10 Torr.

The kneaded composition in the present invention can be prepared by a method of kneading magnetic particles, a binder resin and an organic solvent by using a twin-shaft continuous kneader comprising a container and two stirring shafts disposed and rotatably journaled in parallel with each other at the inside of the container, the stirring shaft having alternately screw portions and paddle portions mounted to the stirring shaft, wherein a ratio of a shaft length to a shaft diameter of the stirring shaft is not less than 25 and a clearance between the wall of the container and the end of the paddle is not greater than 0.25 mm.

Also, the kneaded composition in the present invention can be prepared by a method of kneading magnetic particles, a binder resin and an organic solvent by using a twin-shaft continuous kneader comprising a container and two stirring shafts disposed and rotatably journaled in parallel with each other at the inside of the container, the stirring shaft having alternately screw portions and paddle portions mounted to the stirring shaft, wherein a ratio of a shaft length to a shaft diameter of the stirring shaft is not less than 25 and a clearance between the wall of the container and the end of the paddle is not greater than 0.25 mm, thereby obtaining the kneaded material; adding a solvent to the kneaded material; and then diluting by using the dilution kneader.

The amount of the binder resin to be mixed is 5 to 30 parts, preferably 10 to 25 parts by weight based on 100 parts by weight of the magnetic particles. The amount of the organic solvent to be mixed is 18 to 70 parts by weight, preferably 19 to 67 parts by weight based on 100 parts by weight of the magnetic particles.

Also, the mount of the solvent to be added to the kneaded product is 8 to 183 parts by weight, preferably to parts by weight based on 100 parts by weight of the kneaded material.

As the solvent to be added to the kneaded product of the present invention, there can be used one or more of aromatics such as toluene and xylene, ketones such as methyl ethyl ketone, methyl isobutyl ketone, cyclohexanone and tetrahydrofuran and esters such as ethyl acetate and butyl acetate.

When the kneaded composition is prepared, the magnetic particles, the binder resin and the organic solvent may be kneaded by any method, for example, a method of kneading the starting materials simultaneously; a method of kneading magnetic particles and a previously prepared organic solvent containing a binder resin; and a method of previously mixing magnetic particles with an organic solvent and subsequently, kneading them with a binder resin. The method of kneading the magnetic particles and the previously prepared organic solvent containing the binder resin is preferred.

In the twin-shaft continuous kneader-used in the preparation of the kneaded composition, kneading is conducted mainly by means of a pair of paddles, while the screw mainly conducts feeding.

The ratio of the shaft length to the shaft diameter of the stirring shaft of the twin-shaft continuous kneader is not less than 25, preferably 30 to 60. If the ratio of the shaft length to the shaft diameter of the stirring shaft is less than 25, the magnetic paint material as the object of the present invention can not be prepared. The clearance between the wall of the container and the end of the paddle is not greater than 0.25 mm, preferably, not greater than 0.20 mm. If the clearance between the wall of the container and the end of the paddle exceeds 0.25 mm, it is impossible to prepare the magnetic paint material as the object of the present invention.

As the twin-shaft type continuous kneader mixer, KEXN-30, KEXN-40, KEXN-50, KEXN-65, KEXN-80, KEXN-100, KEXN-125 and KEXN-160 commercially available from Kurimoto Tekkosho Co. can be used.

The magnetic paint according to the present invention is excellent in dispersibility, and as to the dispersibility, a gloss at 45° after dispersion for 6 hours is not less than 120% when formed into a coating film; a gloss at 45° after dispersion for 12 hours is not less than 130%; an average center line roughness (Ra) is not greater than 28.0 nm, preferably not greater than 27.0 nm when formed into a coating film; and an average square roughness (RMS) is not greater than 35.0 nm, preferably not greater than 34.0 nm when formed into a coating film.

In the case where the magnetic iron based alloy particles are used as the magnetic particles, the magnetic paint has further an excellent oxidation stability so that the change of the saturation magnetization with passage of time is not greater than 8% expressed by the saturation magnetic flux density when formed into a coating film and the change of the coercive force with passage of time is not greater than 4%, preferably not greater than 3.5% expressed by coercive force when formed into a coating film; a squareness ratio of not less than 0.85 when formed into a coating film; an orientation degree of not less than 2.85 when formed into a coating film; a residual flux density of not less than 3600 gauss when formed into a coating film; S.F.D. of not greater than 0.51 when formed-into a coating film; and the deadsorption ratio of not greater than 50%, preferably not greater than 45%.

In the case where the magnetic iron oxide particles are used as the magnetic particles, the magnetic paint has further an excellent dispersibility so that a gloss at 45° after dispersion for 2 hours is not less than 110% when formed into a coating film and a gloss at 45° after dispersion for 6 hours is not less than 130% when formed into a coating film; an excellent oxidation stability so that the change of the saturation magnetization with passage of time is not greater than 3.0%, preferably not greater than 1.5% expressed by the saturation magnetic flux density when formed into a coating film and the change of the coercive force with passage of time is not greater than 1.5%, preferably not greater than 1.0% expressed by coercive force when formed into a coating film; an average center line roughness (Ra) of not greater than 16.0 nm when formed into a coating film; an average square roughness (RMS) of not greater than not greater than 18.0 nm when formed into a coating film; a squareness ratio of not less than 0.88 when formed into a coating film; an orientation degree of not less than 3.00 when formed into a coating film; a residual flux density of not less than 1800 gauss when formed into a coating film; S.F.D. of not greater than 0.45 when formed into a coating film; and the deadsorption ratio of not greater than 50%, preferably not greater than 45%.

In the case where the plate-like magnetic ferrite particles are used as the magnetic particles, the magnetic paint has further an excellent dispersibility so that a gloss at 45° after dispersion for 6 hours is not less than 130% when formed into a coating film and a gloss at 45° after dispersion for 12 hours is not less than 140% when formed into a coating film; an average center line roughness (Ra) of not greater than 25.0 nm, preferably not greater than 23.0 nm when formed into a coating film; an average square roughness (RMS) of not greater than 30.0 nm, preferably not greater than 26.0 nm when formed into a coating film; a squareness ratio of not less than 0.83 when formed into a coating film; a residual flux density of not less than 1750 gauss when formed into a coating film; and the deadsorption ratio of not greater than 50%, preferably 45%.

In the magnetic paint according to the present invention, since the surface of the individual magnetic particles in the kneaded composition is sufficiently wetted with the organic solvent, the absorption of the binder resin to the surface of the particles is firm, and a dense and continuous layer is formed, the magnetic particles used in the present invention in the kneaded composition, even if they are fine particles, i.e. particles having a particle size of not greater than 0.25 µm, can exhibit excellent dispersibility rapidly and easily upon production of a magnetic paint. In addition, since oxidation with oxygen in air or the like can be prevented effectively to maintain a great saturation magnetization and a high coercive force over a long period of time, the magnetic paint material of the present invention is most suitable to a material for high density recording and high output characteristic. Further, in the magnetic paint according to the present invention, since the magnetic iron based alloy particles contained in the kneaded composition are effectively prevented from oxidation with oxygen in air, the magnetic paint can be transported and stored only by packing under vacuum with a plastic film having acid resistance, water proofness and solvent resistance, and in particular, it can provide an extremely great economical and industrial effect upon abroad export.

Further, in the magnetic paint according to the present invention, since the surface of the individual magnetic particles in the kneaded composition is sufficiently wetted with the organic solvent or the binder resin, and the absorption of the binder resin to the surface of the particle is firm, the magnetic particles contained in the kneaded composition, even if they are fine particles, i.e., particles having a particle size of not greater than 0.25 µm, can exhibit excellent dispersibility rapidly and easily upon production of a magnetic paint, and accordingly, the magnetic paint material of the present invention is most suitable to a paint material for high density recording and high output characteristic, as well as for low noise level.

The magnetic paint of the present invention composed of a kneaded composition comprising the magnetic particles, the binder resin and the organic solvent, and obtained by kneading and mixing the magnetic particles, the binder resin and the organic solvent by using a the twin-shaft continuous kneader mixer with the ratio of the shaft length to the shaft diameter of the kneading shaft of not less than 25 and with the clearance between the wall of the container and the end of the paddle of not greater than 0.25 mm, the solid content of the magnetic particles and the binder resin in the kneaded composition being from 65 to 85% by weight and the binder resin being from 5 to 30% by weight based on the magnetic particles, even if the magnetic particles are fine, in particular, not greater than 0.25 µm, can exhibit an excellent dispersibility in rapidly and easily due to sufficient shearing stress exerted during kneading upon preparing the magnetic paint, can possess great saturation magnetization and high coercive force for a long period of time by preventing oxidation due to oxygen in air as much as possible, are safe with least danger upon transportation and storage, and can be transported and stored with an industrial and economical advantage by such a simple and convenient pack of merely applying vacuum packaging with a synthetic resin film.

The kneaded product obtained in the present invention, even when it is made of magnetically and chemically instable magnetic particle such as magnetic iron based alloy particles can be sufficiently protected against oxidation with oxygen in air and is extremely stable magnetically and chemically.

For the reason why the magnetic particles in the kneaded composition obtained in accordance with the present invention are magnetically and chemically stable, the present inventors guessed that the surface of particles is sufficiently wetted with organic solvent due to the sufficient exertion of shearing stresses during mixing under kneading even if they are fine, in particular, not greater than 0.25 µm, and a continuous coating of the binder resin is formed during mixing under kneading, so that oxidation with oxygen in air, etc. can be prevented sufficiently.

The magnetic paint obtained by a method of using twin-shaft type continuous kneader upon kneading magnetic particles, a binder resin and an organic solvents as the prior method, wherein the ratio of the shaft length to the shaft diameter of the stirring shaft is less than 25 and the clearance between the wall of the container and the end of the paddle is greater than 0.5 mm in this twin-shaft continuous kneader described in Japanese Patent Applications Laid Open (KOKAI) No. 64-79274 and 64-79275, can not attain the object of the present invention.

Also, with the method of preparing the magnetic paint according to the present invention, since it is possible to manufacture a magnetic paint in which fine magnetic particles can exhibit an excellent dispersibility rapidly and easily upon preparing the magnetic paint, it is most suitable to a magnetic paint for high density recording and low noise level, which are most required at present.

EXAMPLE

The present invention will now be explained by examples, comparative examples and application examples to be described later but the present invention is not restricted to these examples.

In the following examples, comparative examples and application examples, values for the major axis diameter, aspect ratio (major axial diameter/minor axial diameter ratio) of the magnetic particles are shown by average values for the values measured by electron micrographs. Magnetic properties of the magnetic particles and the magnetic recording medium were measured by using sample vibrating-type magnetometer VSM-3S-15 (manufactured by Toei Kogyo Co.) applying an external magnetic field of up to 10 KOe.

S.F.D. was measured by using a differentiation circuit of a magnetic instrument to obtain a differentiated demagnetization curve in a magnetic hysteresis curve, measuring the half value width of the curve and determined by dividing the measured value with the coercive force.

The stability against oxidation with oxygen in air, that is, the change ratio (%) of with passage of time of the magnetic properties of the magnetic particles contained in the kneaded composition was determined by using coating films prepared from a kneaded composition just after preparation and a kneaded composition vacuum-packaged just after preparation and left in an atmosphere at a temperature of 60° C. and a relative humidity of 90% for seven days, respectively, and by dividing the variation coefficients for the value of the saturation magnetic flux density and the coercive force of the coating films prepared therefrom by the values for saturation magnetic flux density and the coercive force of the coating film prepared from the kneaded composition just after the preparation respectively.

The degree of the gloss of the magnetic paint composition was measured by a gloss meter at an incident angle of 45° (manufactured by Suga Testing Machines Co.,) and expressed by a percentage unit based on the gloss of a standard plate assumed as 86.3%.

The surface roughness of the coating film was measured in accordance with JIS B 0601 by using as surface roughness gage: SURFCOM570 A (manufactured by Tokyo Seimitsu Co.). The surface roughness was indicated by "center-line average roughness (Ra)" and "square average roughness- (RMS)".

Preparation of Kneaded Composition

Examples 1–11

Comparative Examples 1–14

Example 1

Using a twin-shaft type continuous kneader "KEXN-30" (manufactured by Kurimoto Tekkosho Co.) having a stirring shaft with a shaft length/shaft diameter ratio of 38 and having a clearance between the wall of a container and the end of a paddle of 0.15 mm, a powder mixture comprising 10 kg of acicular magnetic iron based alloy particles having major axis diameter of 0.15 μm, an aspect ratio (major axis diameter/minor axis diameter) of 8.0, a coercive force of 1590 Oe and a saturation magnetization of 135 emu/g, and 0.3 kg of carbon black #3250 having an average particle size of 26 nm (manufactured by Mitsubishi Kasei Co.) were supplied from a powder supply port at a rate of 3.83 kg/hr and a resin solution at 17.1% concentration MR-110 (Methyl ethyl ketone (MEK)/cyclohexanone=1/1, manufactured by Nippon Zeon Co.) was supplied from a liquid supply port at a rate of 2.17 kg/hr continuously. They were mixed under kneading at a rate of 6.5 kg/hr to obtain a pellet-like kneaded product with 70% by weight of solid concentration.

The kneaded product thus obtained was placed in a polyvinylidene chloride film (SICOPEREN 35 EHL, manufactured by Chugoku Resin Co.) and, after reducing the pressure inside of the package to lower than 10 Torr by evacuation using a vacuum pump, and heat sealing of the opening thereof was carried out to obtain a vacuum packagte for the kneaded product.

Examples 2–11, Comparative Examples 1–14

Kneaded products were obtained in the same procedures as those in Example 1 except for variously changing the kind of magnetic particles, the amount of the carbon black, the kind of the resin solution, the type of the kneader and the processing amount in the kneading. Main preparation conditions are shown in Table 1.

Preparation of Knead-Diluted Product

Example 12–26

Comparative Examples 15–28

Example 12

19.4 g of the kneaded product obtained in Example 1 (acicular magnetic iron based alloy particles: 12 g, resin: 1.44 g, carbon black: 0.36 g, a mixed solvent of methyl ethyl ketone of cyclohexane (mixing ratio of 1:1):5.6 g) and 8.2 g of the said mixed solvent of methyl ethyl ketone and cyclohexanone were continuously supplied to a paint conditioner (manufactured By Toyo Seiki Co., Ltd.) and knead-diluted for 2 hours, thereby obtaining a knead-diluded product with 50% by weight of solid concentration.

Examples 13–26, Comparative Example 15–28

Knead-diluted products were obtained in the same procedures as those in Example 12 except for variously changing the kind and the amount of kneaded products, the amount of the organic solvent, the type of the diluting kneader and the kneading dilution time. Main preparation condition are shown in Table 2.

Preparation of magnetic coating film

Application examples 1–29

Application Example 1

To a 140 ml volume of glass bottle, 27.6 g of the knead-diluted product obtained in Example 12 and additional starting materials so as to give a magnetic paint of the following composition were added together with 95 g of glass beads of 1.5 mmø and the resultant mixture were dispersed with a paint conditioner (manufactured by Toyo Seiki Co.) for 12 hours, thereby obtaining a magnetic paint with 30% by weight of solid concentration.

When a portion of the kneaded product was sampled 6 hours after beginning the dispersion and a magnetic coating layer was prepared in the same way as described below, a gloss of the thus-obtained coating film was 123% and it was confirmed that the product was dispersed rapidly.

After coating the thus-obtained magnetic paint on a PET film by using an applicator, it was oriented, dried, subsequently slit to ½ inch in width and cured at 60° C. for 24 hours, thereby obtaining a magnetic coating film.

| Magnetic particles | 12 g |
| --- | --- |
| Resin | 2.88 g |
| Carbon black | 0.36 g |
| Alumina | 1.2 g |
| Lubricant | 0.3 g |

| | |
|---|---|
| Curing agent | 0.6 g |
| MEK | 20.23 g |
| Toluene | 12.14 g |
| Cyclohexanone | 8.09 g |

The magnetic coating film had a coercive force of 1559 Oe, a squareness ratio of 0.85, an orientation degree of 2.95, a saturation magnetic flux density of 3690 Gauss, a residual magnetic flux density of 3140 Gauss, S.F.D. of 0.493, a gloss of 139%, a surface roughness (Ra) of 25.8 nm and RMs of 32.0 nm.

As the oxidation stability, a change ratio of the coercive force was −3.2% and a change ratio of the saturation magnetic flux density was −6.8%, and it was confirmed that the oxidation stability was excellent.

Application Examples 2–29

Magnetic paints were prepared in the same procedures as those in the Application Example 1 except for variously changing the kinds of the knead-diluted product and the dispersion time. Main preparation conditions and various properties of the resultant magnetic paints are shown in Table 3.

TABLE 1

| | | | | | Preparation of kneaded product | | | | Kneaded product | | |
|---|---|---|---|---|---|---|---|---|---|---|---|
| Example and Comparative Example | Magnetic particles Kind | Carbon black Amount (Kg) | Resin solution Kind | Type of kneader | Kneaded step Amount processed (kg/hr) | Solid concentration (wt %) | Shape | Deadsorption of binder resin | | |
| | | | | | | | | Deadsorption amount (mg) | Deadsorption ratio (%) |
| Example 1 | Acicular magnetic iron based alloy particles (major axis diameter: 0.15 μm, aspect ratio: 8.0, coercive force: 1590 Oe, saturation magnetization: 135 emu/g) | 10 | 0.3 | MR-110 (MEK-cyclohexanone solution) | Twin-shaft continuous kneader KEXX-30 (manufactured by Kurimoto Tekkosho Co.) (shaft length/shaft dia = 38, clearance = 0.15 mm) | 6.5 | 70 | pellet | 0.447 | 37.3 |
| Example 2 | Acicular magnetic iron based alloy particles (major axis diameter: 0.15 μm, aspect ratio: 8.0, coercive force: 1590 Oe, saturation magnetization: 135 emu/g) | 10 | 0.3 | MR-110 (MEK-cyclohexanone solution) | Twin-shaft continuous kneader KEXX-30 (manufactured by Kurimoto Tekkosho Co.) (shaft length/shaft dia = 38, clearance = 0.15 mm) | 6.8 | 75 | " | 0.420 | 35.0 |
| Example 3 | Acicular magnetic iron based alloy particles (major axis diameter: 0.15 μm, aspect ratio: 8.0, coercive force: 1590 Oe, saturation magnetization: 135 emu/g) | 10 | 0.3 | MR-110 (MEK-cyclohexanone solution) | Twin-shaft continuous kneader KEXX-30 (manufactured by Kurimoto Tekkosho Co.) (shaft length/shaft dia = 38, clearance = 0.15 mm) | 4.6 | 80 | " | 0.468 | 39.0 |
| Example 4 | Acicular magnetic iron based alloy particles (major axis diameter: 0.15 μm, aspect ratio: 8.0, coercive force: 1590 Oe, saturation magnetization: 135 emu/g) | 10 | 0.3 | E-900 (MEK-toluene solution) | Twin-shaft continuous kneader KEXX-30 (manufactured by Kurimoto Tekkosho Co.) (shaft length/shaft dia = 38, clearance = 0.15 mm) | 6.8 | 70 | " | 0.480 | 40.0 |
| Example 5 | Acicular magnetic iron based alloy particles (major axis diameter: 0.15 μm, aspect ratio: 8.0, coercive force: 1590 Oe, saturation magnetization: 135 emu/g) | 10 | 0.3 | MR-110 (MEK-cyclohexanone solution) | Twin-shaft continuous kneader KEXX-30 (manufactured by Kurimoto Tekkosho Co.) (shaft length/shaft dia = 30, clearance = 0.15 mm) | 6.5 | 70 | pellet | 0.523 | 43.3 |
| Example 6 | Ba-containing plate-like composite ferrite particles (plate surface diameter: 0.15 μm, aspect ratio: 5.0, coercive force: 650 Oe, saturation magnetization: 58 emu/g) (Ni/Fe = 10.5 wt %, Ti/Fe = 4.0 wt %, Zn/Fe = 5.5 wt %) | 10 | 0.3 | MR-110 (MEK-cyclohexanone soution) | Same twin shaft continuous kneader as in Example 1 | 7.0 | 80 | pellet | 0.412 | 34.3 |
| Example 7 | Co-coated acicular magnetite particles (major axis diameter: 0.18 μm, aspect ratio: 7.5, | 10 | 0.3 | MR-110 (MEK-cyclohexanone | Same twin shaft continuous kneader as in Example 1 | 8.0 | 75 | " | 0.360 | 30.0 |

TABLE 1-continued

| Example and Comparative Example | Preparation of kneaded product | | | | | | | Kneaded product | | | |
|---|---|---|---|---|---|---|---|---|---|---|---|
| | Magnetic particles Kind | Carbon black Amount (Kg) | Resin solution Kind | Type of kneader | Kneaded step Amount processed (kg/hr) | Solid concentration (wt %) | Shape | Deadsorption of binder resin | | |
| | | | | | | | | Deadsorption amount (mg) | Deadsorption ratio (%) |
| Example 8 | Co-coated acicular maghemite particles (major axis diameter: 0.18 μm, aspect ratio: 7.5, coercive force: 720 Oe, saturation magnetization: 78 emu/g) | 0.3 | MR-110 (MEK-cyclohexanone solution) | Same twin shaft continuous kneader as in Example 1 | 8.5 | 75 | " | 0.286 | 23.8 |
| Example 9 | Co-coated acicular maghemite particles (major axis diameter: 0.18 μm, aspect ratio: 7.5, coercive force: 720 Oe, saturation magnetization: 78 emu/g) | 0.3 | MR-110 (MEK-cyclohexanone solution) | Same twin shaft continuous kneader as in Example 1 | 8.2 | 78 | " | 0.312 | 26.0 |
| Example 10 | Same Ba-containing plate-like composite ferrite particles as in Example 6 | 0.3 | MR-110 (MEK-cyclohexanone solution) | Same twin shaft continuous kneader as in Example 1 | 4.3 | 80 | " | 0.355 | 29.6 |
| Example 11 | Same Ba-containing plate-like composite ferrite particles as in Example 6 | 0.3 | MR-110 (MEK-cyclohexanone solution) | Same twin shaft continuous kneader as in Example 5 | 4.2 | 70 | " | 0.386 | 32.2 |
| Comp. Example 1 | Same acicular magnetic iron based alloy particles as in Example 1 | 0.0345 | MR-110 (MEK-cyclohexanone solution) | Press kneader batch type DS-1 (manufactured by Moriyama Seisakusho Co.) (clearance = 2 mm) | — | 70 | bulky | 0.766 | 63.8 |
| Comp. Example 2 | Same acicular magnetic iron based alloy particles as in Example 1 | 0.0345 | MR-110 (MEK-cyclohexanone solution) | Press kneader batch type DS-1 (manufactured by Moriyama Seisakusho Co.) (clearance = 2 mm) | — | 75 | " | 0.755 | 62.9 |
| Comp. Example 3 | Same acicular magnetic iron based alloy particles as in Example 1 | 0.3 | MR-100 (MEK-cyclohexanone solution) | Twin-shaft continuous kneader T2KRC kneader (manufactured by Kurimoto Tekkosho Co.) (shaft length/shaft diameter = 10, clearance = 0.5 mm) | 9.5 | 70 | pellet | 0.685 | 57.1 |
| Comp. Example 4 | Same acicular magnetic iron based alloy particles as in Example 1 | 0.3 | MR-100 (MEK-cyclohexanone solution) | Twin-shaft continuous kneader T2KRC kneader (manufactured by Kurimoto Tekkosho Co.) (shaft length/shaft diameter = 10, clearance = 0.5 mm) | 7.4 | 75 | " | 0.707 | 58.9 |
| Comp. | Same acicular magnetic iron | 0.3 | MR-100 | Same twin-shaft continuous | 8.0 | 50 | paste | 0.858 | 71.5 |

TABLE 1-continued

Preparation of kneaded product

| Example and Comparative Example | Magnetic particles Kind | Carbon black Amount (Kg) | Resin solution Kind | Kneaded step Type of kneader | Amount processed (kg/hr) | Solid concentration (wt %) | Kneaded product Shape | Deadsorption of binder resin Deadsorption amount (mg) | Deadsorption ratio (%) |
|---|---|---|---|---|---|---|---|---|---|
| Example 5 | based alloy particles as in Example 1 | | (MEK-cyclohexanone solution) | kneader as in Example 1 | | | | | |
| Comp. Example 6 | Same acicular magnetic iron based alloy particles as in Example 1 | 0.3 | MR-100 (MEK-cyclohexanone solution) | Same twin-shaft continuous kneader as in Example 1 | 7.8 | 90 | powder | 0.850 | 70.8 |
| Comp. Example 7 | Same Co-coated acicular magnetic iron particles as in Example 7 | 0.3 | MR-110 (MEK-cyclohexanone solution) | Same twin shaft continuous kneader in Comparative Example 3 | 8.0 | 75 | powder | 0.347 | 28.9 |
| Comp. Example 8 | Same plate-like Ba ferrite as in Example 6 | 0.3 | MR-110 (MEK-cyclohexanone solution) | Same twin shaft continuous kneader in Comparative Example 3 | 6.8 | 80 | " | 0.443 | 36.5 |
| Comp. Example 9 | Same Co-coated acicular maghemite particles as in Example 8 | 0.0345 | MR-110 (MEK-cyclohexanone solution) | Press kneader batch type DS-1 (manufactured by Moriyama Seisakusho Co.) (clearance = 2 mm) | — | 75 | bulky | 0.616 | 51.3 |
| Comp. Example 10 | Same plate-like Ba ferrite as in Example 6 | 0.0345 | MR-110 (MEK-cyclohexanone solution) | Press kneader batch type DS-1 (manufactured by Moriyama Seisakusho Co.) (clearance = 2 mm) | — | 80 | " | 0.725 | 60.4 |
| Comp. Example 11 | Same Co-coated acicular maghemite particles as in Example 8 | 0.3 | MR-110 (MEK-cyclohexanone solution) | Twin-shaft continuous kneader T2KRC Keader (manufacture by Kurimoto Tekkosho Co.) (shaft length/shaft diameter = 10, clearance = 0.5 mm) | 9.5 | 75 | pellet | 0.610 | 50.8 |
| Comp. Example 12 | Same plate-like Ba ferrite as in Example 6 | 0.3 | MR-110 (MEK-cyclohexanone solution) | Twin-shaft continuous kneader T2KRC Keader (manufacture by Kurimoto | 4.8 | 80 | " | 0.777 | 64.8 |

TABLE 1-continued

Preparation of kneaded product

| Example and Comparative Example | Magnetic particles Kind | Carbon black Amount (Kg) | Resin solution Kind | Type of kneader | Kneaded step Amount processed (kg/hr) | Solid concentration (wt %) | Kneaded product Shape | Deadsorption of binder resin Deadsorption amount (mg) | Deadsorption ratio (%) |
|---|---|---|---|---|---|---|---|---|---|
| Comp. Example 13 | Same Co-coated acicular maghemite particles as in Example 8 | 10 | 0.3 | MR-110 (MEK-cyclohexanone solution | Tekkosho Co.) (shaft length/shaft diameter = 10, clearance = 0.5 mm) Same twin-shaft continuous kneader as in Example 1 | 10.2 | 50 | paste | 0.638 | 53.2 |
| Comp. Example 14 | Same Co-coated acicular maghemite particles as in Example 8 | 10 | 0.3 | MR-110 (MEK-cyclohexanone solution | Same twin-shaft continuous kneader as in Example 1 | 6.8 | 90 | powder | 0.798 | 66.5 |

TABLE 2

| Example and Comparative Example | Example No. and Comparative Example No. | Kneaded product Total amount of kneaded product (g) | Composition Amount of magnetic particles (g) | Amount of resin (g) | Amount of carbon black (g) | Amount of organic solvent (g) | Organic solvent Amount (g) | Type of dilution kneader | Kneading dilution step Time (hr) | Knead-diluted product Solid concentration (wt %) |
|---|---|---|---|---|---|---|---|---|---|---|
| Example 12 | Ex. 1 | 19.4 | 12 | 1.44 | 0.36 | 5.6 | 8.2 | Paint conditioner (manufactured by Toyo Seiki Co.) | 2 | 50 |
| Example 13 | Ex. 1 | 1643 | 1000 | 120 | 30 | 493 | 657 | Planetary mixer PLM-5 (manufactured by Inoue Seisakusho Co.) | 1 | 50 |
| Example 14 | Ex. 1 | 5000 | 3043 | 365 | 92 | 1500 | 2000 | Twin-shaft continuous Kneader KEXN-30 (manufactured by Kurimoto Tekkosho Co.) | * | 50 |
| Example 15 | Ex. 2 | 18.4 | 12 | 1.44 | 0.36 | 4.6 | 12.3 | Same paint conditioner as Example 12 | 2 | 45 |
| Example 16 | Ex. 2 | 1533 | 1000 | 120 | 30 | 383 | 1023 | Same planatary mixer as in Example 13 | 1 | 45 |
| Example 17 | Ex. 3 | 17.25 | 12 | 1.44 | 0.36 | 3.45 | 13.4 | Same paint conditioner as in Example 12 | 2 | 45 |
| Example 18 | Ex. 4 | 19.4 | 12 | 1.44 | 0.36 | 5.6 | 8.2 | Same paint conditioner as in Example 12 | 2 | 50 |
| Example 19 | Ex. 5 | 5000 | 3043 | 365 | 92 | 1500 | 2000 | Same twin-shaft continuous kneader as in Example 14 | * | 50 |
| Example 20 | Ex. 6 | 17.25 | 12 | 1.44 | 0.36 | 3.45 | 13.4 | Same twin-shaft continuous kneader as in Example 14 | 2 | 45 |
| Example 21 | Ex. 7 | 18.4 | 12 | 1.44 | 0.36 | 4.6 | 12.3 | Same twin-shaft continuous kneader as in Example 14 | 2 | 45 |
| Example 22 | Ex. 8 | 18.4 | 12 | 1.44 | 0.36 | 4.6 | 12.3 | Same twin-shaft continuous kneader as in Example 14 | 2 | 45 |
| Example 23 | Example 9 | 17.7 | 12 | 1.44 | 0.36 | 3.9 | 13.0 | Same paint conditioner as Example 12 | 2 | 45 |
| Example 24 | Example 9 | 1474 | 1000 | 120 | 30 | 324 | 1081 | Same planatary mixer as in Example 13 | 1 | 45 |
| Example 25 | Example 10 | 17.25 | 12 | 1.44 | 0.36 | 3.45 | 10.35 | Same paint conditioner as Example 12 | 2 | 50 |
| Example 26 | Example 11 | 5000 | 3043 | 365 | 92 | 1500 | 2000 | Same twin-shaft continuous kneader as in Example 14 | * | 50 |
| Comp. Example 15 | Comp. Ex. 1 | 19.4 | 12 | 1.44 | 0.36 | 5.6 | 8.2 | Same paint conditioner as Example 12 | 2 | 50 |
| Comp. Example 16 | Comp. Ex. 2 | 18.4 | 12 | 1.44 | 0.36 | 4.6 | 12.3 | Same paint conditioner as Example 12 | 2 | 45 |
| Comp. Example 17 | Comp. Ex. 3 | 19.4 | 12 | 1.44 | 0.36 | 5.6 | 8.2 | Same paint conditioner as Example 12 | 2 | 50 |
| Comp. | Comp. | 18.4 | 12 | 1.44 | 0.36 | 4.6 | 12.3 | Same paint conditioner as Example 12 | 2 | 45 |

TABLE 2-continued

| Example and Comparative Example | Example No. and Comparative Example No. | Kneaded product | | | | | Preparation of knead-diluted product | | Knead-diluted product |
| --- | --- | --- | --- | --- | --- | --- | --- | --- | --- |
| | | Total amount of kneaded product (g) | Composition | | | | | | Solid concentration (wt %) |
| | | | Amount of magnetic particles (g) | Amount of resin (g) | Amount of carbon black (g) | Amount of organic solvent (g) | Organic solvent Amount (g) | Type of dilution kneader | |
| | | | | | | | | | Kneading dilution step Time (hr) | |
| Example 18 | Ex. 4 | 27.6 | 12 | 1.44 | 0.36 | 13.8 | 3.1 | Same paint conditioner as Example 12 | 2 | 45 |
| Example 19 | Comp. Ex. 5 | 15.3 | 12 | 1.44 | 0.36 | 1.5 | 15.4 | Same paint conditioner as Example 12 | 2 | 45 |
| Example 20 | Comp. Ex. 6 | 18.4 | 12 | 1.44 | 0.36 | 4.6 | 12.3 | Same paint conditioner as Example 12 | 2 | 45 |
| Example 21 | Comp. Ex. 7 | 17.25 | 12 | 1.44 | 0.36 | 3.45 | 13.4 | Same paint conditioner as Example 12 | 2 | 45 |
| Example 22 | Comp. Ex. 8 | 18.4 | 12 | 1.44 | 0.36 | 4.6 | 9.2 | Same paint conditioner as in Example 12 | 2 | 50 |
| Comp. Ex. 23 | Comp. Ex. 9 | 17.25 | 12 | 1.44 | 0.36 | 3.45 | 13.4 | Same paint conditioner as in Example 12 | 2 | 45 |
| Comp. Ex. 24 | Comp. Ex. 10 | 18.4 | 12 | 1.44 | 0.36 | 4.6 | 9.2 | Same paint conditioner as in Example 12 | 2 | 50 |
| Comp. Ex. 25 | Comp. Ex. 11 | 17.25 | 12 | 1.44 | 0.36 | 3.45 | 13.4 | Same paint conditioner as in Example 12 | 2 | 45 |
| Comp. Ex. 26 | Comp. Ex. 12 | 27.6 | 12 | 1.44 | 0.36 | 13.8 | 3.1 | Same paint conditioner as in Example 12 | 2 | 45 |
| Comp. Ex. 27 | Comp. Ex. 13 | 15.3 | 12 | 1.44 | 0.36 | 1.5 | 15.4 | Same paint conditioner as in Example 12 | 2 | 45 |
| Comp. Ex. 28 | Comp. Ex. 14 | | | | | | | | | |

(Note) *: Passed for once in twin shaft continuous kneader

TABLE 3

| Application Example and Comparative Example | Preparation of magnetic coating material | | Property of magnetic coating film | | | | | | | | | | | |
|---|---|---|---|---|---|---|---|---|---|---|---|---|---|---|
| | Knead-diluted product | Dispersion in paint conditioner (Hr) | Coercive force (Oe) | Squareness ratio | Orientation degree | Saturation magnetic flux density (Gauss) | Residual magnetic flux density (Gauss) | S.F.D. | 45° gloss | | | Surface roughness | | Oxidation stability |
| | | | | | | | | | 6 hour dispersion (%) | 12-hour dispersion (%) | Mean roughness Square (RMS) (nm) | Mean roughness along center line (Ra) (nm) | Rate of change of coercive force (%) | Rate of saturation magnetic flux density (%) |
| Application Example 1 | Example 12 | 12 | 1559 | 0.85 | 2.95 | 3690 | 3140 | 0.493 | 123 | 139 | 25.8 | 32.0 | -3.2 | -6.8 |
| Application Example 2 | Example 13 | 12 | 1573 | 0.86 | 2.95 | 3710 | 3230 | 0.489 | 125 | 143 | 23.8 | 28.8 | -3.0 | -6.5 |
| Application Example 3 | Example 14 | 12 | 1577 | 0.88 | 3.04 | 3780 | 3330 | 0.488 | 145 | 152 | 19.8 | 23.4 | -1.8 | -4.3 |
| Application Example 4 | Example 15 | 12 | 1569 | 0.85 | 2.93 | 3710 | 3150 | 0.499 | 123 | 140 | 24.8 | 29.8 | -2.5 | -7.3 |
| Application Example 5 | Example 16 | 12 | 1566 | 0.85 | 2.96 | 3710 | 3150 | 0.495 | 130 | 143 | 23.3 | 25.6 | -3.3 | -6.6 |
| Application Example 6 | Example 17 | 12 | 1559 | 0.85 | 2.88 | 3810 | 3240 | 0.505 | 133 | 146 | 26.5 | 29.8 | -4.6 | -6.5 |
| Application Example 7 | Example 18 | 12 | 1572 | 0.86 | 2.93 | 3680 | 3160 | 0.500 | 125 | 132 | 23.5 | 26.2 | -2.6 | -7.2 |
| Application Example 8 | Example 19 | 12 | 1560 | 0.87 | 2.95 | 3700 | 3220 | 0.490 | 138 | 145 | 20.6 | 23.2 | -2.0 | -5.0 |
| Application Example 9 | Example 20 | 12 | 683 | 0.88 | — | 1830 | 1610 | — | 142 | 146 | 21.6 | 24.2 | — | — |
| Application Example 10 | Example 21 | 6 | 748 | 0.89 | 3.26 | 1950 | 1740 | 0.420 | 135 (123*) | — | 14.4 | 16.8 | -0.5 | -1.2 |
| Application Example 11 | Example 22 | 6 | 755 | 0.90 | 3.43 | 1880 | 1690 | 0.380 | 145 (138*) | — | 13.2 | 15.4 | — | — |
| Application Example 12 | Example 23 | 6 | 745 | 0.90 | 3.40 | 1910 | 1720 | 0.398 | 151 | — | 13.8 | 16.2 | | |
| Application Example 13 | Example 24 | 6 | 756 | 0.90 | 3.39 | 1950 | 1755 | 0.396 | 155 | — | 12.6 | 13.8 | | |
| Application Example 14 | Example 25 | 12 | 683 | 0.88 | — | 1830 | 1610 | — | 142 | 146 | 21.6 | 24.2 | | |
| Application Example 15 | Example 26 | 12 | 692 | 0.88 | — | 1880 | 1650 | — | 148 | 152 | 19.2 | 23.2 | | |
| Application Example 16 | Comp. Example 15 | 12 | 1559 | 0.78 | 2.65 | 3030 | 2360 | 0.523 | 88 | 110 | 67.2 | 82.6 | -5.3 | -10.8 |
| Application Example 17 | Comp. Ex. 16 | 12 | 1530 | 0.76 | 2.58 | 2970 | 2260 | 0.536 | 68 | 90 | 106 | 134 | -5.5 | -13.2 |
| Application Comp. | | 12 | 568 | 0.84 | 2.78 | 3490 | 2930 | 0.503 | 108 | 126 | 46.4 | 58.0 | -4.4 | -8.9 |

TABLE 3-continued

| Application Example and Comparative Example | Preparation of magnetic coating material | | Property of magnetic coating film | | | | | | | | | | | Surface roughness | | Oxidation stability | |
|---|---|---|---|---|---|---|---|---|---|---|---|---|---|---|---|---|---|
| | Knead-diluted product | Dispersion in paint conditioner (Hr) | Coercive firce (Oe) | Squareness ratio | Orientation degree | Saturatio magnetic flux density (Gauss) | Residual magnetic flux density (Gauss) | S.F.D. | 45° gloss | | | | | Mean roughn Square along center line (Ra) (nm) | Rate of mean roughness (RMS) (nm) | Rate of change of coercive force (%) | Rate of saturation magnetic flux density (%) |
| | | | | | | | | | | 6 hour dispersion (%) | | 12-hour dispersion (%) | | | | | |
| Application Example 18 | Ex. 17 | 12 | 1570 | 0.84 | 2.80 | 3580 | 3010 | 0.499 | 116 | | 126 | | | 30.0 | 37.0 | −4.5 | −9.3 |
| Application Example 19 | Comp. Ex. 18 | 12 | 1573 | 0.72 | 2.50 | 3010 | 2170 | 0.550 | 50 | | 82 | | | 159 | 188 | −6.8 | −15.5 |
| Application Example 20 | Comp. Ex. 19 | 12 | 1490 | 0.68 | 2.33 | 3720 | 2530 | 0.578 | 32 | | 68 | | | 233 | 268 | −7.2 | −19.2 |
| Application Example 21 | Comp. Ex. 20 | 6 | 743 | 0.86 | 2.98 | 1760 | 1510 | 0.458 | 125 (102*) 126 | | — | | | 16.8 | 18.6 | −2.0 | −3.8 |
| Application Example 22 | Comp. Ex. 21 | 12 | 669 | 0.81 | — | 1690 | 1370 | — | 126 | | 132 | | | 28.0 | 34.0 | — | — |
| Application Example 23 | Comp. Ex. 22 | 6 | 743 | 0.86 | 2.98 | 1760 | 1510 | 0.458 | 125 | | — | | | 16.8 | 18.6 | | |
| Application Example 24 | Comp. Ex. 23 | 6 | 738 | 0.84 | 2.77 | 1810 | 1490 | 0.488 | 126 | | — | | | 18.8 | 20.8 | | |
| Application Example 25 | Comp. Ex. 24 | 6 | 740 | 0.80 | 2.90 | 1860 | 1370 | 0.500 | 115 | | — | | | 21.6 | 23.2 | | |
| Application Example 26 | Comp. Ex. 25 | 12 | 669 | 0.81 | — | 1690 | 1370 | — | 126 | | 132 | | | 28.0 | 34.0 | | |
| Application Example 27 | Comp. Ex. 26 | 6 | 760 | 0.84 | 3.01 | 1800 | 1510 | 0.478 | 126 | | — | | | 18.8 | 20.8 | | |
| Application Example 28 | Ex. 27 | 6 | 756 | 0.80 | 2.88 | 1860 | 1490 | 0.501 | 119 | | — | | | 21.6 | 23.8 | | |

(Note) *: 45° gloss (%) after dispersion for 2 hours.

What is claimed is:

1. A method of preparing a magnetic paint comprising kneading fine magnetic iron based alloy particles, acicular fine magnetic iron oxide particles or plate-like fine magnetic ferrite particles having a particle size of not greater than 0.2 µm, a binder resin and an organic solvent by using a twin-shaft continuous kneader comprising a container and two stirring shafts disposed and rotatably journaled in parallel with each other in the container, in which the stirring shaft has alternately screw portions and paddle portions mounted to the stirring shaft, a ratio of the shaft length to the shaft diameter of the stirring shaft is not less than 25 and a clearance between a wall of the container and an end of the paddle is not greater than 0.25 mm, and if necessary adding a solvent to the kneaded material and then diluting the kneaded material.

* * * * *